United States Patent [19]

Miyahara et al.

[11] Patent Number: 5,145,648
[45] Date of Patent: Sep. 8, 1992

[54] EXHAUST SMOKE PURIFIER APPARATUS

[75] Inventors: Shinjirou Miyahara, Yamatokouriyama; Ikuo Matsumoto; Kenji Tabata, both of Ikoma; Hiroshi Fukuda, Nara, all of Japan

[73] Assignee: Matsushita Electric Industrial Co., Ltd., Kadoma, Japan

[21] Appl. No.: 465,174
[22] PCT Filed: Jun. 26, 1989
[86] PCT No.: PCT/JP89/00632
 § 371 Date: Feb. 23, 1990
 § 102(e) Date: Feb. 23, 1990
[87] PCT Pub. No.: WO90/00081
 PCT Pub. Date: Jan. 11, 1990

[30] Foreign Application Priority Data
 Jun. 28, 1988 [JP] Japan .................... 63-159981
 Jul. 13, 1988 [JP] Japan .................... 63-174510

[51] Int. Cl.$^5$ .................................... A62B 15/00
[52] U.S. Cl. .................................... 422/124; 422/122; 422/168; 422/169; 422/178; 55/267; 55/DIG. 36
[58] Field of Search .............. 422/122, 124, 168, 169, 422/177, 178; 55/267, DIG. 36

[56] References Cited

U.S. PATENT DOCUMENTS 3,804,942  4/1974  Kato et al. .................... 422/122
4,348,362  9/1982  Foss ............................... 422/178
4,948,567  8/1990  Atarashiya .................... 422/122

FOREIGN PATENT DOCUMENTS 0070326   5/1980  Japan .................... 55/DIG. 36
0037434   4/1981  Japan .................... 55/DIG. 36
0097520   8/1981  Japan .................... 422/122
56-97520  8/1981  Japan .
2071031   3/1990  Japan .................... 55/DIG. 36
2071032   3/1990  Japan .................... 55/DIG. 36

Primary Examiner—Robert J. Warden
Assistant Examiner—Laura E. Collins
Attorney, Agent, or Firm—Cushman, Darby & Cushman

[57] ABSTRACT

The present invention is an exhaust smoke purifier apparatus which contains a reservoir part consisting of an adsorbent and a purifier part. The purifier part includes a purifying agent. The present invention has a regeneration function and oil smoke and the like generated in cooking is drafted into the purifier apparatus by a greater air blow rate to temporarily hold it in the reservoir part. After cooking, the oil smoke and the like is introduced from the reservoir part into the purifier part at a smaller air blow rate and is thereby purified. The exhaust smoke purifier apparatus requires minimal manual treatment for captured oil smoke and the like, and is very clean. The apparatus can effectively purify with a very small amount of purifying agent. The apparatus can also be made small.

2 Claims, 4 Drawing Sheets

EXHAUST SMOKE PURIFIER APPARATUS

BACKGROUND OF THE INVENTION

1. Field of the Invention

The present invention relates to an apparatus for capturing oil smoke and the like generated while cooking from a range used in a kitchen and the like.

2. Background Information

Hitherto, the exhaust smoke purifier apparatus for capturing oil smoke generated while cooking from a range used in a kitchen and the like is assembled, as shown in FIG. 1. An exhaust smoke duct 6 is provided with one end being open as an inlet port 3. The inlet port is placed near a side part of a burner part 2 of a range 1. The other end of the duct is directed outdoors, penetrating through a wall 4 of a house, to make an exhaust port 5. A blower 7 is provided at the exhaust port 5. Furthermore, a detachable grease filter 8 is provided in the exhaust smoke duct 6 at the part near the inlet port 3, in order to isolate oil contained in the oil smoke. The solid arrows show the air flow.

In the above-mentioned assembly, when the blower 7 is driven, an air flow is generated which is in the direction from the inlet port 3 to the exhaust port 5, and oil smoke is drafted together with the air flow drafted from the inlet port 3 into the exhaust duct 6. On the other hand, the oil contained in the oil smoke adheres on the grease filter 8, and thereafter purified air is drafted outdoors from the exhaust port 5. Periodically, the grease filter 8 is removed from the exhaust duct 6 and washed by detergent or the like.

In the above-mentioned assembly, however, the oil adhering on the grease filter needs to be washed by removing the grease filter from the exhaust duct. A problem exists in that the environment is polluted from the washing and the like. Besides, odors generated from the cooking are exhausted outdoors in relatively large amounts in a relatively short period of time.

SUMMARY OF THE INVENTION

The present invention solves the above-mentioned conventional problems and effectively captures oil smoke inside the kitchen by integrally assembling a purifier, such as a catalyst and odor adsorbent in an exhaust duct, thereby sanitarily processing the oil and odor.

To solve the above-mentioned problems, a first embodiment of the present invention provides a reservoir part for temporarily holding oil smoke and the like, a purifier part for purifying the oil and an auxiliary blower. The auxiliary blower is set to have a smaller blow rate than the blow rate of an exhaust blower. The reservoir is integrally provided in an exhaust smoke duct whereof one end is open as an inlet port at a vicinity of a range and the other end is open as an exhaust port at a vicinity of the exhaust blower. The oil smoke, and the like, is captured by a greater air blow rate by the above-mentioned exhausting blower to hold it in the above-mentioned reservoir part. After cooking, the oil smoke and the like in the above-mentioned reservoir part is introduced into the purifier part by the above-mentioned auxiliary blower to purify it.

And, a second embodiment of the present invention provides a reservoir part for temporarily reserving oil smoke and the like and a purifier for purifying the oil. The reservoir is integrally provided in an exhaust smoke duct whereof one end is open as an inlet port at a vicinity of a range and the other end is open as an exhaust port at a vicinity of an exhaust blower. The exhaust blower is capable of two kinds of air blow rates. The oil smoke and the like during cooking is first captured by driving the above-mentioned exhausting blower at a greater air blow rate to reserve it in the above-mentioned reservoir part. After cooking, the oil smoke and the like in the above-mentioned reservoir part is introduced into the purifier part by driving the above-mentioned exhaust blower at a smaller air blow rate to purify it.

And furthermore, a third embodiment of the present invention provides a reservoir part for temporarily holding oil smoke and the like and a purifier for purifying the oil. The reservoir is integrally provided in an exhaust smoke duct whereof one end is open as an inlet port at a vicinity of a range and the other end is open as an exhaust port at a vicinity of an exhaust blower. The above-mentioned reservoir part is composed of a grease filter containing a built-in electric heater at an upstream side, and a honeycomb active carbon arranged at a downstream side of the grease filter. The oil smoke and the like during cooking is captured by a greater air blow rate to be held in the above-mentioned purifier part, and after the cooking the oil smoke and the like in the above-mentioned reservoir part is introduced into the purifier part by a smaller air blow rate to purify it.

DETAILED DESCRIPTION OF THE INVENTION

Figure 1:
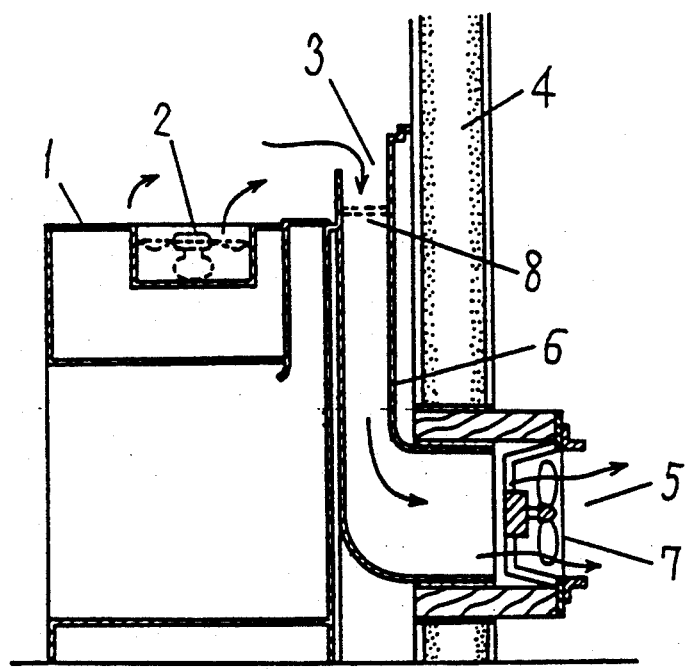
FIG. 1 is a sectional view of a conventional exhaust smoke purifier apparatus.
Figure 2:
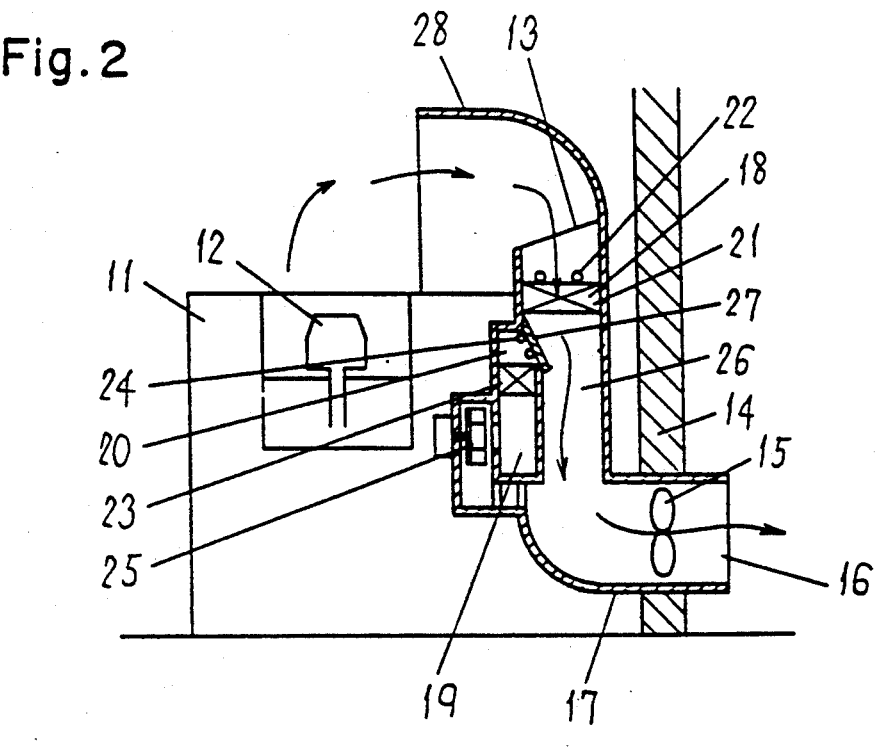
FIG. 2 is a sectional view of an exhaust smoke purifier apparatus in capturing operation for oil smoke and the like showing a first embodiment of the present invention.
Figure 3:
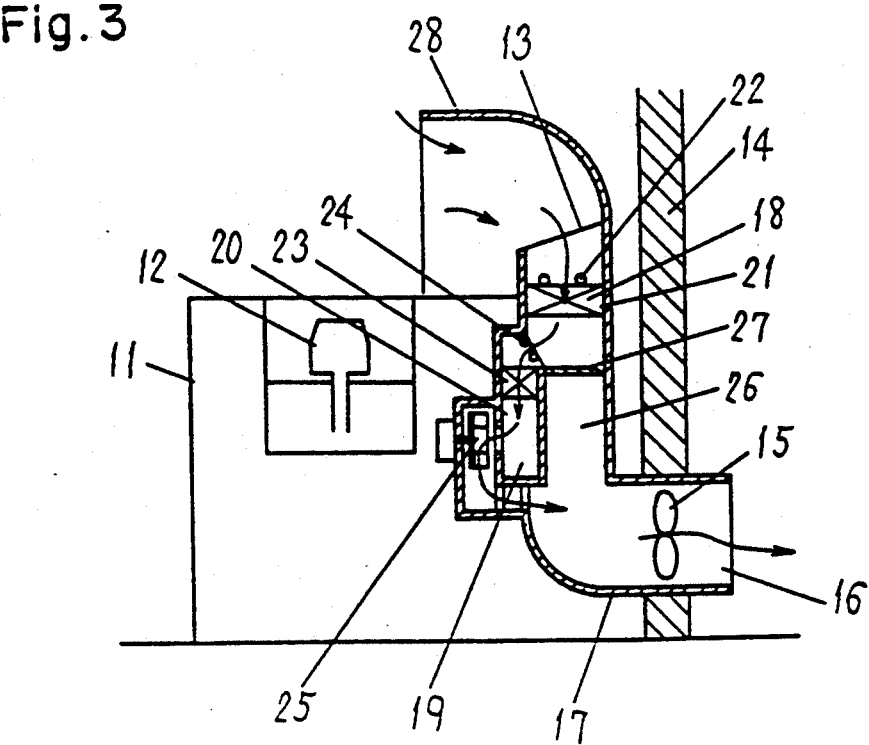
FIG. 3 is a sectional view of the above-mentioned apparatus in purifying operation.

A first embodiment of the present invention is described with reference to the accompanying FIGURES. FIG. 2 and FIG. 3 are sectional views showing an embodiment of the present invention. FIG. 2 shows a device in operation to capture oil smoke and the like. FIG. 3 shows the device in its purifying operation.

An exhaust smoke purifier apparatus of the present invention is assembled with, as shown in FIG. 2 and FIG. 3, a reservoir part 18 for temporarily holding oil and odor and a purifier part 19 for purifying the oil. The exhaust smoke purifier apparatus is provided in an exhaust smoke duct 17. One end of the apparatus is open as an inlet port 13 at a side part of a burner part 12 of a range 11 and the other end is directed outdoors, penetrating through a wall 14 of a house, to make an exhaust port 16 which is provided with an exhaust blower 15. The purifier part 19 is in a bypass path 20. The bypass path upstream side faces the reservoir part 18 and the downstream side faces the exhaust port 16. The reservoir part 18 includes an adsorbent 21, of activated carbon formed into a honeycomb-shape, and a heater 22, upstream of the adsorbent 21, for heating the adsorbent 21. The purifier part 19 includes an oxidation catalyst 23, formed into a honeycomb-shape, and a reheating heater 24 provided at an upstream side of the oxidation catalyst 23, for reheating air flow introduced in the purifier part 19, and an auxiliary blower 25 provided at a downstream side of the oxidation catalyst 23. A damper 27 selectively closes either an inlet of the bypass path 20 or the exhaust smoke duct side path 26. The blow rate of the auxiliary blower 25 is set smaller than the blow rate of the exhaust blower 15. A hood 28 is provided over the range 11 for effectively capturing oil smoke and the like produced at the range 11. The solid arrows show the direction of the air flow.

The operation of the apparatus in capturing oil smoke and the like from cooking is described next. An air flow path is first formed by closing, with the damper 27, the entrance of the bypass path 20 and opening the exhaust smoke duct side path 26, as shown in FIG. 2. The exhaust blower 15 is then driven and an air flow from the inlet port 13 to the exhaust port 16 is generated. Oil smoke produced at the range 11 is drafted into the exhaust smoke duct 17 together with this air flow. In this case, the exhaust blower 15 has enough of a blow rate to effectively capture the oil smoke and the like. On the other hand, when the oil component and the odor drafted into the exhaust smoke duct 17 passes through the reservoir part 18, provided in the inlet port 13, they are separated from the air flow by adhering on the surface of the adsorbent 21 and at the same time the odor is also adsorbed in the adsorbent 21 and removed therefrom. During this operation, the auxiliary blower 25 is stopped as is the electrification to the heater 22 and the reheating heater 24.

The purifying operation after cooking is described next. As shown in FIG. 3, the exhaust smoke duct side path 26 is closed with the damper 27 and an air flow path is formed through an opening of the inlet of the bypass path 20. The auxiliary blower 25 is driven, and at the same time the heater 22 heats the adsorbent 21. The heating of the adsorbent 21 releases components adhered on or adsorbed in the adsorbent 21 and the components are thereafter introduced into the purifier part 19 at a small air blow rate. The components pass through the oxidation catalyst 23, and are exhausted as purified air from the exhaust port 16. During this operation, the exhaust blower 15 is stopped. When the temperature of the air flow entering the bypass path 20 is low, the reheating heater 24, provided in the purifier part 19, is electrified to increase the operating temperature so that the oxidation catalyst 23 will act effectively.

Figure 4:
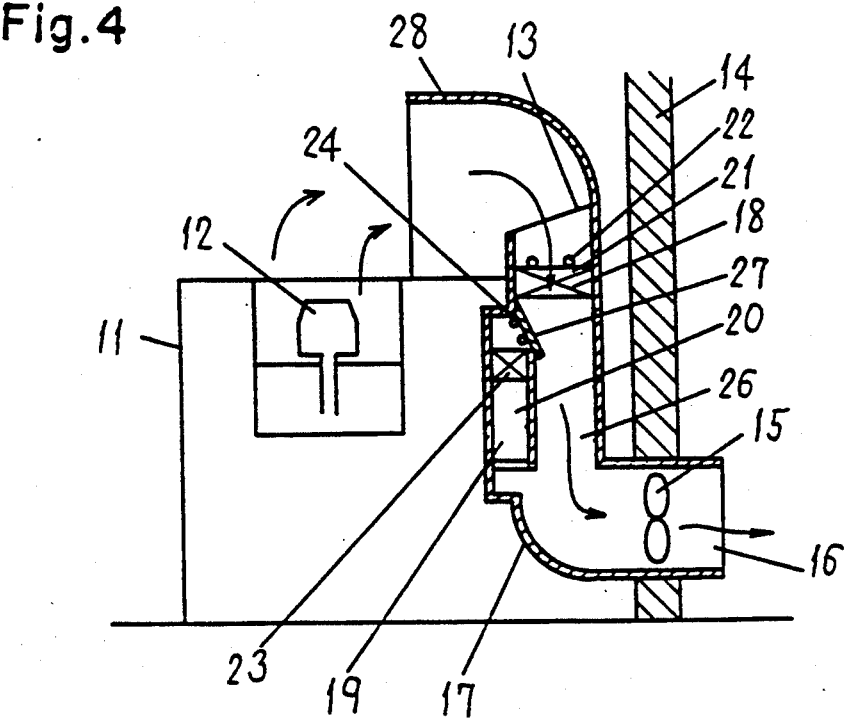
FIG. 4 is a sectional view of an exhaust smoke purifier apparatus in capturing operation for oil smoke and the like showing a second embodiment.
Figure 5:
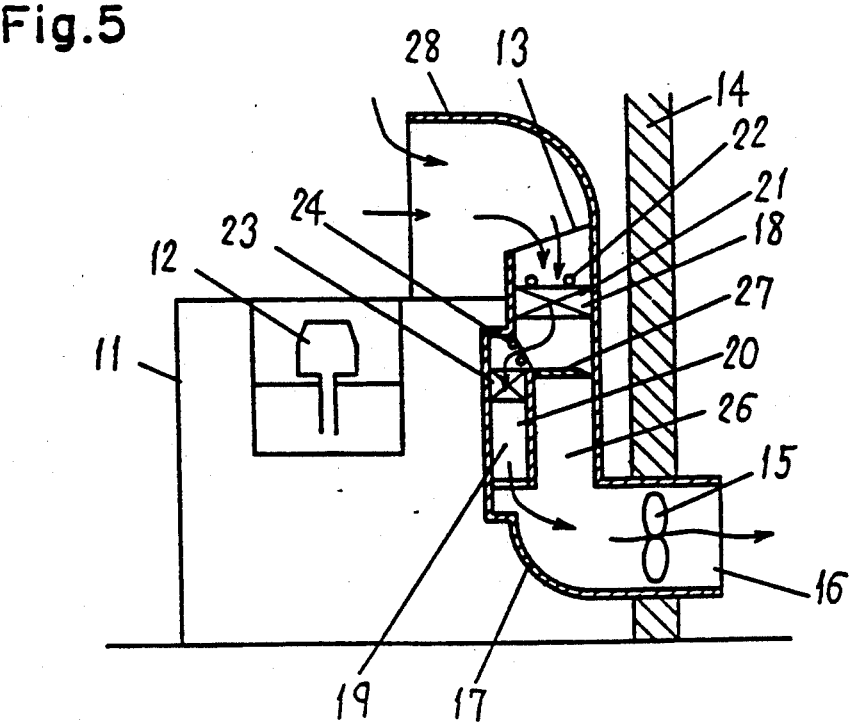
FIG. 5 is a sectional view of the above-mentioned apparatus in purifying operation.

FIG. 4 and FIG. 5 show a second embodiment of the present invention. FIG. 4 shows a device in operation to capture oil smoke and the like. FIG. 5 shows the device in its purifying operation.

An exhaust smoke purifier apparatus A of the present invention is made, as shown in FIG. 4 and FIG. 5, by providing a reservoir part 18 for temporarily holding oil and odor and a purifier part 19 for purifying the oil. The exhaust smoke purifier apparatus is integrally provided in an exhaust smoke duct 17. One end of the apparatus is open as an inlet port 13 at a side part of a burner part 12 of a range 11 and the other end is directed outdoors, penetrating through a wall 14 of a house, to make an exhaust port 16 which is provided with an exhaust blower 15. The purifier part 19 is in a bypass path 20. The bypass path upstream side faces the reservoir part 18 and the downstream side faces the exhaust port 16. The reservoir part 18 includes an adsorbent 21, of activated carbon formed into a honeycomb-shape, and a heater 22, upstream of the adsorbent 21, for heating the adsorbent 21. The purifier part 19 includes an oxidation catalyst 23, formed into a honeycomb-shape, and a reheating heater 24 provided at an upstream side of the oxidation catalyst 23 for reheating air flow introduced in the purifier part 19. A damper 27 selectively closes either an inlet of the bypass path 20 or the exhaust smoke duct side path 26. The blow rate of the exhaust blower 15 is variable for at least two kinds of blow rates. A hood 28 is provided over the range 11 for effectively capturing oil smoke and the like produced at the range 11. The solid arrows show the direction of the air flow.

The operation of the apparatus in capturing oil smoke and the like from cooking is described next. An air flow path is first formed by closing, with damper 27, the entrance of the bypass path 20 and opening the exhaust smoke duct side path 26, as shown in FIG. 2. The exhaust blower 15 is then driven at a first greater air blow rate, and an air flow from the inlet port 13 to the exhaust port 16 is generated. Oil smoke produced at the range 11 is drafted into the exhaust smoke duct 17 together with this air flow. In this case, since the exhaust blower 15 is driven at a capacity of a first greater air blow rate, the apparatus can effectively capture the oil smoke and the like. On the other hand, when the oil component and the odor drafted into the exhaust smoke duct 17 passes through the reservoir part 18, provided in the inlet port 13, they are separated from the air flow by adhering on the surface of the adsorbent 21 and at the same time the odor is also adsorbed in the adsorbent 21 and removed therefrom. During this operation, electrification to the heater 22 and the reheating heater 24 is stopped.

The purifying operation after cooking is described next. As shown in FIG. 5, the exhaust smoke duct side path 26 is closed with the damper 27 and an air flow path is formed through an opening of the inlet of the bypass path 20. The exhaust blower 15 is driven at a second smaller air blow rate, and at the same time the heater 22 heats the adsorbent 21. The heating of the adsorbent 21 releases components adhered on or adsorbed in the adsorbent 21, and the components are thereafter introduced into the purifier part 19 at a small air blow rate. The components pass through the oxidation catalyst 23, and are exhausted as purified air from the exhaust port 16. During this operation, when the temperature of the air flow entering the bypass path 20 is low, the reheating heater 24, provided in the purifier 19, is electrified to increase the operating temperature so that the oxidation catalyst 23 will act effectively.

Figure 6:
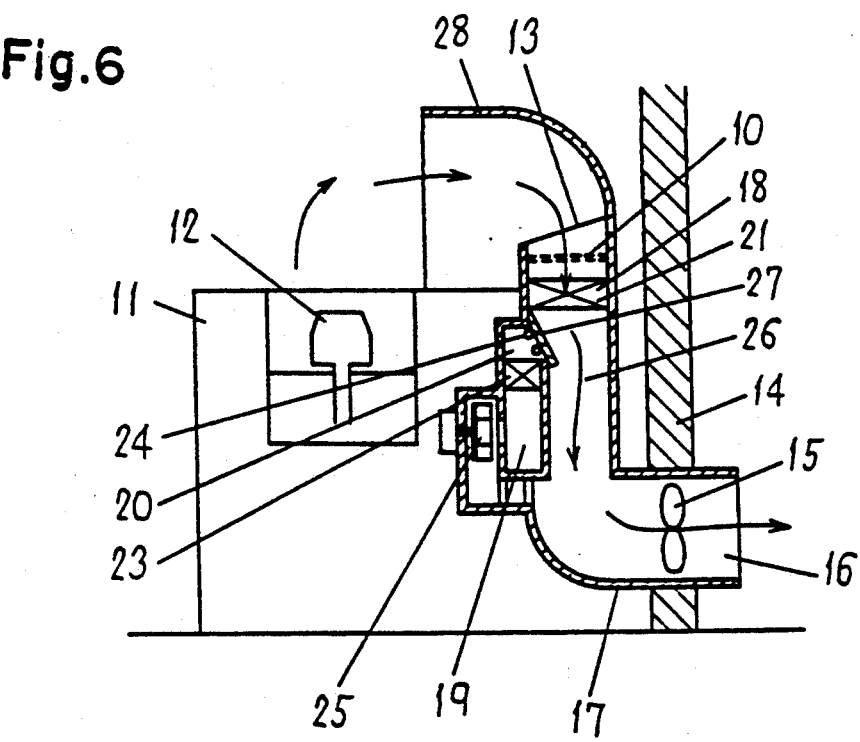
FIG. 6 is a sectional view of an exhaust smoke purifier apparatus in capturing operation for oil smoke and the like showing a third embodiment.
Figure 7:
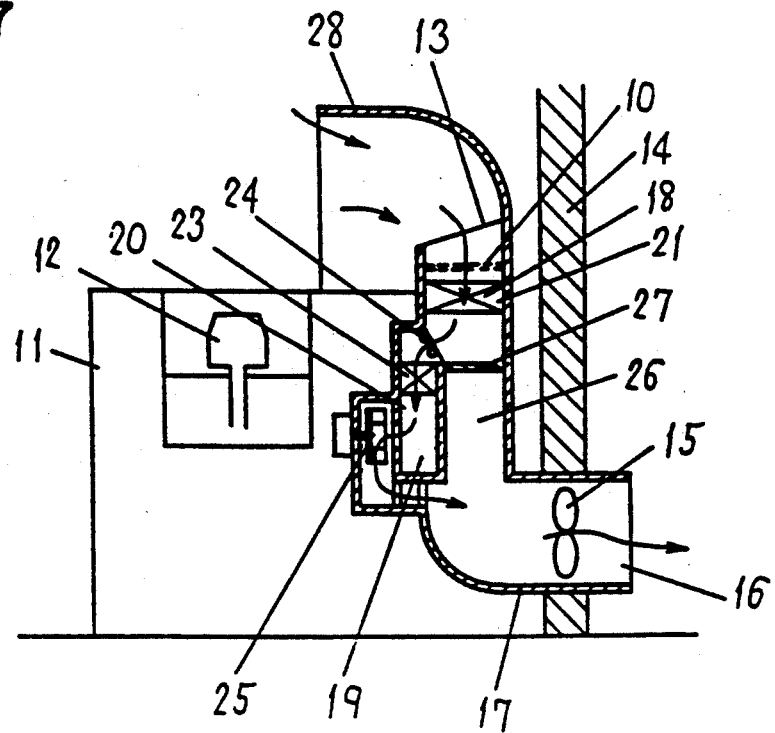
FIG. 7 is a sectional view of the above-mentioned apparatus in purifying operation.

FIG. 6 and FIG. 7 show a third embodiment of the present invention. FIG. 6 shows a device in operation to capture operation for oil smoke and the like, and FIG. 7 shows the device in its purifying operation.

An exhaust smoke purifier apparatus A of the present invention is made, as shown in FIG. 6 and FIG. 7, by providing a reservoir part 18 for temporarily holding oil and odor and a purifier part 19 for purifying the oil. The exhaust smoke purifier apparatus is integrally provided in an exhaust smoke duct 17. One end of the apparatus is open as an inlet port 13 at a side part of a burner part 12 of a range 11 and the other end is directed outdoors, penetrating through a wall 14 of a house, to make an exhaust port 16 which is provided with an exhaust blower 15. The purifier part 19 is in a bypass path 20. The bypass path upstream side faces the reservoir part 18 and the downstream side faces the exhaust port 16. The reservoir part 18 includes an adsorbent 21, of activated carbon formed into a honeycomb-shape, and a grease filter 10 containing a built-in electric heater. The grease filter 10 is located a predetermined distance upstream of the adsorbent 21. The purifier part 19 includes an oxidation catalyst 23, formed into a honeycomb-shape, and a reheating heater 24 provided at an upstream side of the oxidation catalyst 23 for reheating air flow introduced in the purifier part 19, and an auxiliary blower 25 provided at a downstream side of the oxidation catalyst 23. A damper 27 selectively closes either the inlet of the bypass path 20 or the exhaust smoke duct side path 26. The blow rate of the auxiliary blower 25 has a smaller blow rate than the blow rate of the exhaust blower 15. A hood 28 is provided over the range 11 for effectively capturing oil smoke and the like produced at the range 11. The solid arrows show the direction of the air flow.

The operation of the apparatus in capturing oil smoke and the like in cooking is described next. An air flow path is first formed by closing, with damper 27, the entrance of the bypass path 20 and opening the exhaust smoke duct side path 26, as shown in FIG. 6. The exhaust blower 15 is then driven and an air flow from the inlet port 13 to the exhaust port 16 is generated. Oil smoke produced at the range 11 is drafted into the exhaust smoke duct 17 together with this air flow. In this case, the exhaust blower 15 has enough of a blow rate to effectively capture the oil smoke and the like. On the other hand, when the oil component and the odor drafted into the exhaust smoke duct 17 passes through the reservoir part 18, provided in the inlet port 13, they are separated from the air flow by adhering on or adsorbed in the grease filter 10 and the adsorbent 21. Mists of large grains of oil at a high boiling point are caught by the grease filter 10 before being captured in the adsorbent 21, to prevent the adsorbent 21 from being polluted. The odor and the like as well as the oil mist are therefore efficiently adsorbed by the adsorbent 21. During this operation, the auxiliary blower 25 is stopped and electrification to the built-in electric heater contained in the grease filter 10 and the reheating heater 24 is stopped too.

The purifying operation after cooking is described next. As shown in FIG. 7, the exhaust smoke duct side path 26 is closed with the damper 27 and an air flow path is formed through an opening of the inlet of the bypass path 20. The auxiliary blower 25 is driven, and the built-in electric heater contained in the grease filter 10 is energized. By heating of the electric heater, the oil components of high boiling point adhering on the grease filter 10 are decomposed and removed therefrom. The adsorbent 21, at the downstream side therefrom, is also heated and releases components adsorbed therein. At the same time, the components are introduced into the purifier part 19 at a small air blow rate. The components pass through the oxidation catalyst 23, and are exhausted as purified air from the exhaust port 16. During this operation, the exhaust blower 15 is stopped. When the temperature of the air flow entering the bypass path 20 is low, the reheating heater 24, provided in the purifier part 19, is electrified to increase the operating temperature so that the oxidation catalyst 23 will act effectively.

As mentioned above, since the exhaust smoke purifier apparatus of the present invention operates at a greater air blow rate in cooking and at a smaller air blow rate after cooking, it can effectively capture the oil smoke and the like and can effectively purify with a very small amount of purifying agent. The apparatus can be made small. The apparatus is given a regeneration function by containing a purifying agent and adsorbent in the exhaust smoke duct. The apparatus also requires minimal manual treatment for oil and the like, and is very clean.

Further, is it possible to simplify the constitution of the purifier apparatus by using a blower having a least two or more kinds of blow rate characteristic.

Furthermore, it is possible to effectively adsorb odor as well as oil mist having a high boiling point, by providing a grease heater containing a built-in electric heater, an adsorbent of activated carbon formed into honeycomb-shape, and an oxidation catalyst in the exhaust smoke duct.

We claim:

1. A kitchen exhaust smoke purifier apparatus comprising:

an exhaust smoke duct, one end of said exhaust smoke duct being an inlet port in a vicinity of a range and the other end being an exhaust port which is provided with an exhaust blower;

a reservoir part, said reservoir part being in said exhaust smoke duct and facing said inlet port, said reservoir part temporarily holding oil smoke and the like, said reservoir part including an adsorbent and a heater, said heater being upstream of said adsorbent for heating said adsorbent;

a main path and a bypass path being provided in parallel and between said reservoir part and said exhaust blower;

a purifier part being in said bypass path, said purifier part including an oxidation catalyst and a reheating heater, said reheating heater being upstream of said oxidation catalyst for reheating air flow introduced in said purifier part, said purifier part further including an auxiliary blower, said auxiliary blower being downstream of said oxidation catalyst; and a damper for selectively closing an inlet of said bypass path and said main path.

2. A kitchen exhaust smoke purifier apparatus in accordance with claim 1, wherein when said damper closes the inlet of said bypass path, said exhaust blower is driven at a sufficient blow rate to capture oil smoke and the like from said range in cooking, said auxiliary blower is stopped and electrification to said heater and said reheating heater is stopped; and when said damper closes the inlet of said main path, said heater heats said adsorbent for releasing components adhered on and adsorbed in said adsorbent, said auxiliary blower is driven for introducing said components into said purifier part and for passing said components through said oxidation catalyst at a small air blow rate, said exhaust blower is stopped, and said reheating heater is actuated for increasing the temperature of an air flow entering said bypass path to an operating temperature in a manner so that said oxidation catalyst acts effectively when a temperature of an air flow entering said bypass path is lower than a predetermined temperature, after cooking.

* * * * *